United States Patent
Kobayashi

(10) Patent No.: US 9,921,786 B2
(45) Date of Patent: Mar. 20, 2018

(54) IMAGE PROCESSING APPARATUS AND METHOD FOR DIVIDING IMAGE INTO DIVISION REGIONS AND GENERATING A PIECE OF BITMAP IMAGE DATA BY PROCESSING A PIECE OF DIVISION-REGION DATA, AND NON-TRANSITORY COMPUTER READABLE MEDIUM THEREOF

(71) Applicant: FUJI XEROX CO., LTD., Tokyo (JP)

(72) Inventor: Yuta Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/051,024

(22) Filed: Feb. 23, 2016

(65) Prior Publication Data
US 2017/0046106 A1 Feb. 16, 2017

(30) Foreign Application Priority Data
Aug. 14, 2015 (JP) .................................. 2015-160069

(51) Int. Cl.
*G06F 3/12* (2006.01)
*G06K 15/02* (2006.01)

(52) U.S. Cl.
CPC .......... *G06F 3/1213* (2013.01); *G06F 3/1241* (2013.01); *G06F 3/1245* (2013.01); *G06F 3/1285* (2013.01); *G06K 15/18* (2013.01)

(58) Field of Classification Search
None
See application file for complete search history.

(56) References Cited

U.S. PATENT DOCUMENTS

| 2005/0286063 A1* | 12/2005 | Owen | G06F 3/1205 |
| | | | 358/1.13 |
| 2007/0052559 A1* | 3/2007 | Ohk | H04N 1/4115 |
| | | | 341/50 |

(Continued)

FOREIGN PATENT DOCUMENTS

| JP | H10-278361 A | 10/1998 |
| JP | H11-144062 A | 5/1999 |

(Continued)

OTHER PUBLICATIONS

Translation of JP 2015-069616 A.*

*Primary Examiner* — Marivelisse Santiago Cordero
*Assistant Examiner* — Lennin Rodriguezgonzalez
(74) *Attorney, Agent, or Firm* — Oliff PLC

(57) ABSTRACT

An image processing apparatus includes a division unit and a generation unit. The division unit divides an image represented by image forming data into multiple division regions. The generation unit generates a piece of bitmap image data by causing a hardware processing unit to process a piece of division-region data selected from among pieces of division-region data of the multiple division regions in descending order of processing loads of image processing performed when pieces of bitmap image data are generated from the respective pieces of division-region data, the processing loads being obtained for the respective division regions, and by causing a CPU to perform software processing on a piece of division-region data selected from among the pieces of division-region data in ascending order of the processing loads.

23 Claims, 7 Drawing Sheets

(56) References Cited

U.S. PATENT DOCUMENTS

| | | | | |
|---|---|---|---|---|
| 2009/0060394 A1* | 3/2009 | Yamazaki | .......... | G06K 9/00228 |
| | | | | 382/311 |
| 2010/0253953 A1* | 10/2010 | Oota | .................. | H04N 1/3333 |
| | | | | 358/1.9 |
| 2012/0013938 A1* | 1/2012 | Nogawa | .................. | H04N 1/40 |
| | | | | 358/1.15 |

FOREIGN PATENT DOCUMENTS

| | | | |
|---|---|---|---|
| JP | 2014-039181 A | | 2/2014 |
| JP | 2015069616 A | * | 4/2015 |

* cited by examiner

FIG. 5

|   | IMAGE | | SOLID-COLOR IMAGE | | GRADATION IMAGE | | PROCESSING LOAD |
|---|---|---|---|---|---|---|---|
|   | AREA [%] | WEIGHT | AREA [%] | WEIGHT | AREA [%] | WEIGHT | |
| A | 10 | 5 | 0 | -2 | 20 | 2 | 90 |
| B | 50 | | 0 | | 22 | | 294 |
| C | 10 | | 20 | | 11 | | 32 |
| D | 0 | | 20 | | 0 | | -40 |

IMAGE PROCESSING APPARATUS AND METHOD FOR DIVIDING IMAGE INTO DIVISION REGIONS AND GENERATING A PIECE OF BITMAP IMAGE DATA BY PROCESSING A PIECE OF DIVISION-REGION DATA, AND NON-TRANSITORY COMPUTER READABLE MEDIUM THEREOF

CROSS-REFERENCE TO RELATED APPLICATIONS

This application is based on and claims priority under 35 USC 119 from Japanese Patent Application No. 2015-160069 filed Aug. 14, 2015.

BACKGROUND

Technical Field

The present invention relates to an image processing apparatus, an image processing method, and a non-transitory computer readable medium.

SUMMARY

According to an aspect of the invention, there is provided an image processing apparatus including a division unit and a generation unit. The division unit divides an image represented by image forming data into multiple division regions. The generation unit generates a piece of bitmap image data by causing a hardware processing unit to process a piece of division-region data selected from among pieces of division-region data of the multiple division regions in descending order of processing loads of image processing performed when pieces of bitmap image data are generated from the respective pieces of division-region data, the processing loads being obtained for the respective multiple division regions, and by causing a CPU to perform software processing on a piece of division-region data selected from among the pieces of division-region data in ascending order of the processing loads.

BRIEF DESCRIPTION OF THE DRAWINGS

Exemplary embodiments of the present invention will be described in detail based on the following figures, wherein:

FIG. 5 is a diagram for describing processing loads;

DETAILED DESCRIPTION

In the following, exemplary embodiments of the present invention will be described in detail with reference to the drawings.

(First Exemplary Embodiment)

Figure 1:
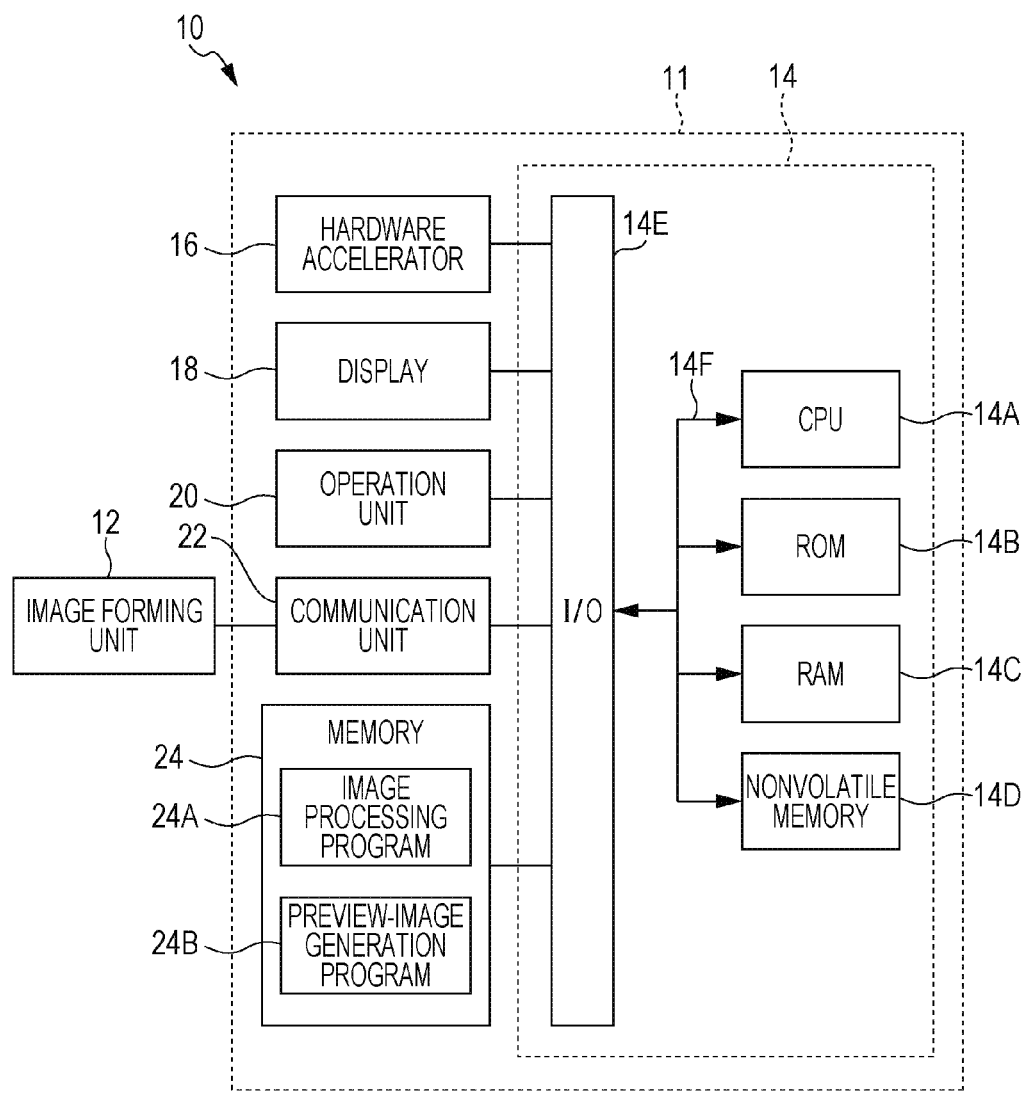
FIG. 1 is a schematic configuration diagram illustrating the configuration of an image forming apparatus according to a first exemplary embodiment.

First, the configuration of an image forming apparatus 10 according to the present exemplary embodiment will be described with reference to FIG. 1. The image forming apparatus 10 includes an image processing unit 11 serving as an example of an image processing apparatus, and an image forming unit 12 serving as an example of an image forming unit.

The image processing unit 11 includes a controller 14. The controller 14 is configured such that a central processing unit (CPU) 14A serving as an example of a control unit, a read-only memory (ROM) 14B, a random-access memory (RAM) 14C, a nonvolatile memory 14D, and an input-output interface (I/O) 14E are connected to each other via a bus 14F.

Functional units such as a hardware accelerator 16, a display 18, an operation unit 20, a communication unit 22, and a memory 24 are connected to the I/O 14E.

The hardware accelerator 16 is a functional unit that realizes various types of image processing using hardware. Here, the types of image processing includes an intermediate-data generation process, a rasterization process, color processing, spatial filtering, and the like. The intermediate-data generation process is a process in which intermediate data is generated by interpreting, as an example of image forming data, print data described in, for example, a page description language (PDL). The rasterization process is a process in which a bitmap image is generated from intermediate data. The color processing is processing for obtaining good color reproduction properties regarding the appearance of a printed image. The spatial filtering is processing for the degree of sharpness of edges. The types of image processing are not limited to these types.

The display 18 displays preview images and various other types of information. A preview image is an image for confirming beforehand, in a case where an image is to be printed on a recording medium such as a paper sheet by the image forming unit 12, an image to be actually printed on a recording medium.

The operation unit 20 includes, for example, a mouse and a keyboard, and is used to realize operations for various types of screen displayed on the display 18.

The communication unit 22 is an interface for performing data communication with the image forming unit 12 and other external devices.

The memory 24 stores an image processing program 24A and a preview-image generation program 24B, which will be described later. The memory 24 is realized by, for example, a hard disk, a nonvolatile memory, or the like. The preview-image generation program 24B is a program for generating a preview image used to confirm, beforehand, the final look of a certain image before printing of the image, and is a program for executing processing similar to various types of image processing executed by the above-described hardware accelerator 16. Note that, for the same process, when the case where the process is executed by the hardware accelerator 16 is compared with the case where the process is executed by software processing at the CPU 14A using the preview-image generation program 24B, a processing time period is likely to be shorter in the former case.

The CPU 14A reads and executes the image processing program 24A and the preview-image generation program 24B stored in the memory 24. Note that the image processing program 24A and the preview-image generation program 24B may be recorded on a storage medium such as a CD-ROM and provided. Alternatively, the image processing program 24A and the preview-image generation program 24B may be provided via a network.

The image forming unit 12 is a device that forms an image on a recording medium using, for example, a so-called electrophotographic system. Specifically, the image forming unit 12 includes a charging device, an exposure device, a developing device, a transfer device, a fixing device, and the like. The charging device is a device for charging a photoconductor drum. The exposure device forms on the photoconductor drum an electrostatic latent image corresponding to a certain image by exposing the photoconductor drum, which is charged, to light corresponding to the image. The developing device performs toner development on the electrostatic latent image formed on the photoconductor drum. The transfer device transfers, to a recording medium, a toner image formed on the photoconductor drum. The fixing device fixes the toner image transferred to the recording medium. Note that an inkjet recording device may also be used as the image forming unit 12. In this case, the image forming unit 12 includes an inkjet recording head that ejects ink in accordance with an image onto a recording medium.

Figure 2:
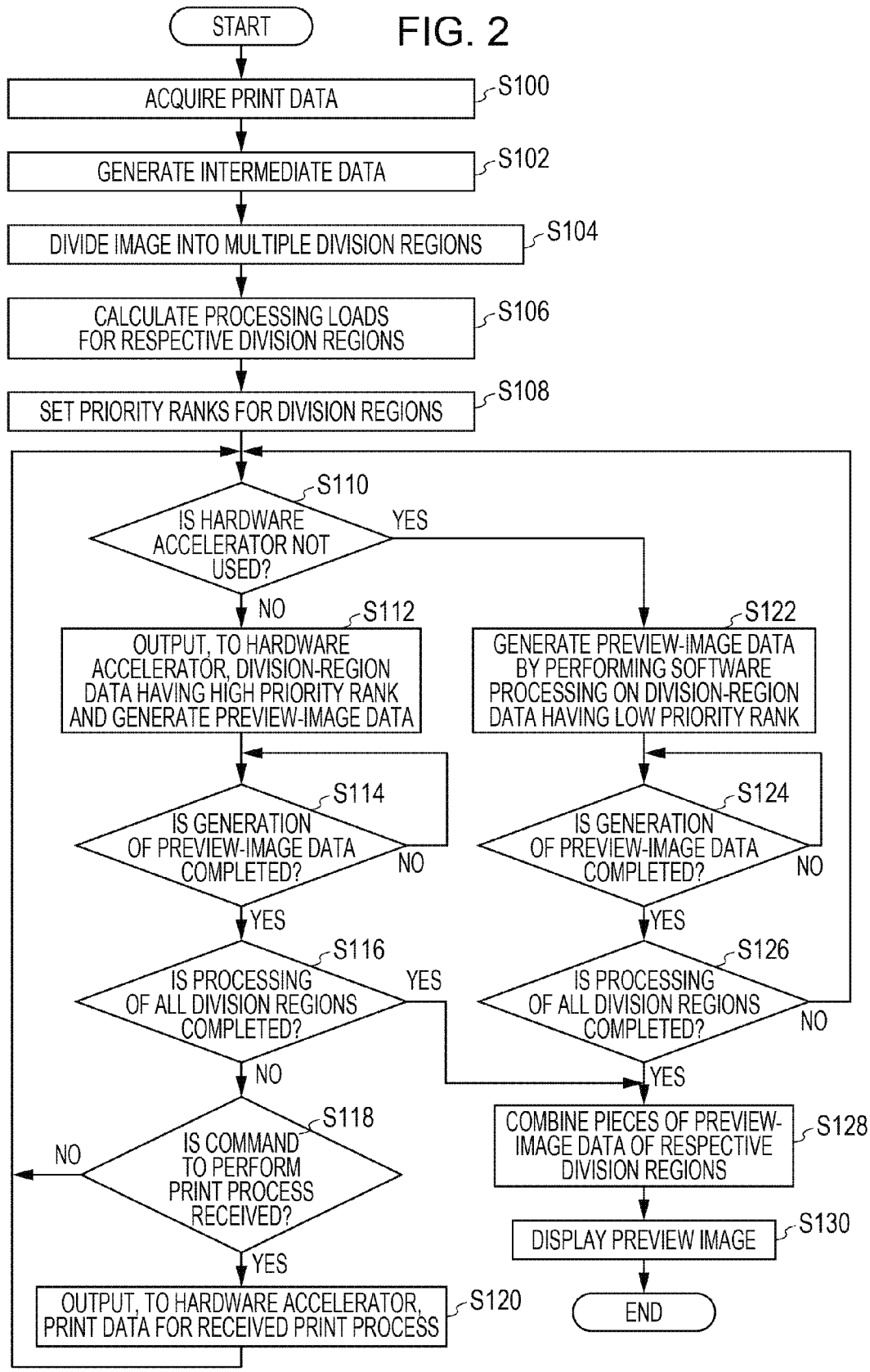
FIG. 2 is a flowchart illustrating an example of processing steps of an image processing program according to the first exemplary embodiment.

Next, image processing executed by the CPU 14A will be described as an operation of the present exemplary embodiment. The process illustrated in FIG. 2 is a flowchart illustrating processing steps of the image processing program 24A executed by the CPU 14A. The image processing program 24A is executed, for example, when a user specifies a document represented by print data and issues a command to display a preview image. In the present exemplary embodiment, when the hardware accelerator 16 is not used, preview-image data for displaying a preview image is generated using the hardware accelerator 16. When the hardware accelerator 16 is being used in a print process serving as an image forming process, processing for generating preview-image data is performed by software processing.

In step S100, print data specified by a user is acquired. For example, in the case where the user has specified print data prestored in the memory 24, the print data specified by the user is acquired by reading the specified print data from the memory 24. In addition, in the case where the user has transmitted print data from a client terminal, which is not illustrated, the transmitted print data is acquired through reception via the communication unit 22. Note that the print data is print data described in, for example, a PDL.

In step S102, the print data described in the PDL is interpreted, and intermediate data is generated. Intermediate data is data in a format in which bitmap data is generated in a shorter processing time period than in the case where bitmap data is generated directly from print data described in the PDL.

Figure 3:
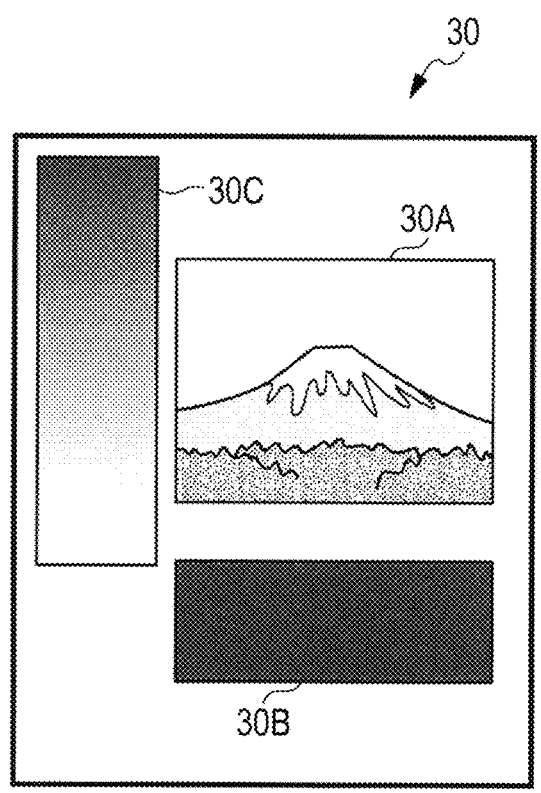
FIG. 3 is a diagram illustrating an example of an image.
Figure 4:
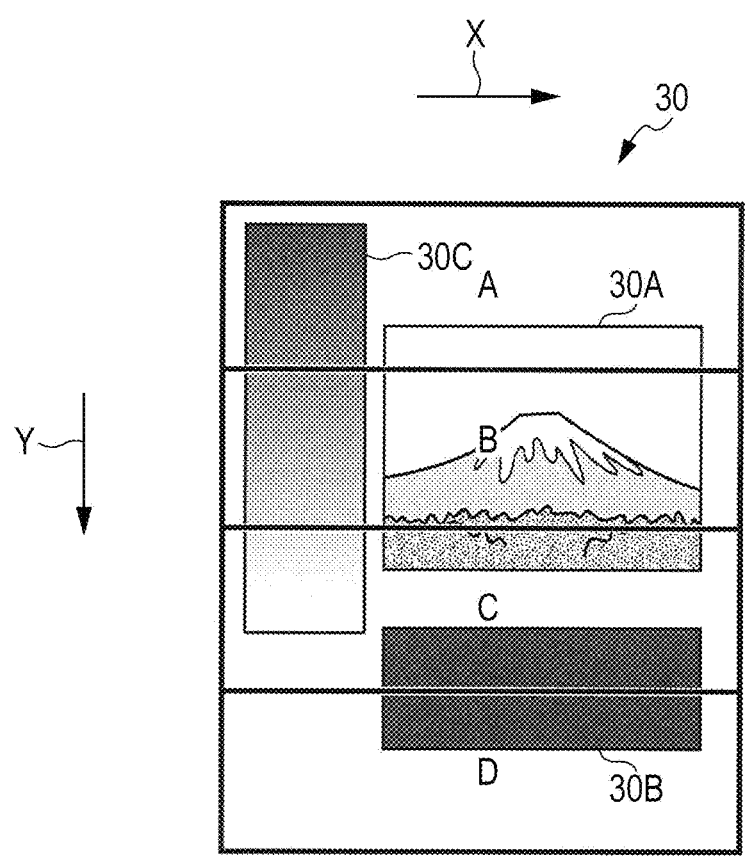
FIG. 4 is a diagram illustrating an example of a case where an image is divided into multiple division regions.

In step S104, the image represented by the intermediate data is divided into multiple division regions. For example, the case will be described where the image represented by the intermediate data is an image 30 as illustrated in FIG. 3. In this case, as illustrated in FIG. 4, for example, the image 30 is divided into four division regions A to D in the Y direction, the longitudinal direction. Note that an image-division method is not limited to the method illustrated in FIG. 4. For example, the number of regions into which the image 30 is divided is not limited to four, and may be an arbitrary number greater than or equal to two. In addition, the image 30 may be divided in the X direction, which is orthogonal to the Y direction. In addition, the image 30 may be divided in both the X direction and the Y direction such that the division regions are arranged in a tile-like manner. In the example of FIG. 4, the image 30 is divided such that the sizes of the division regions A to D become equal. However, the image 30 may be divided such that the sizes of the division regions become unequal.

In step S106, processing loads are calculated for the respective division regions obtained as a result of the division performed in step S104. In the present exemplary embodiment, for each of the division regions, the processing load of the division region is calculated from feature values of objects each of which serves as an example of an image element included in the division region, and weights predetermined for the objects. Note that a weight is predetermined on an object-type-by-object-type basis. Here, for example, in the case where an object is subjected to image processing, a processing load is a time period required for the image processing.

Note that the types of object include, for example, an image, a solid-color image, and a gradation image. The image is, for example, an image such as a photo. The gradation image is, for example, an image whose color density changes gradually. The solid-color image is an image whose color density is constant. Note that the types of object are not limited to these.

In the present exemplary embodiment, the area of an object is used as a feature value of the object. For example, in the case of the image 30 illustrated in FIG. 3, an image 30A, a solid-color image 30B, and a gradation image 30C are included as objects. As illustrated in FIGS. 4 and 5, 10% of the division region A is an image, 0% of the division region A is a solid-color image, and 20% of the division region A is a gradation image. In addition, as an example, weights are predetermined in the present exemplary embodiment such that the weight of the image is "5", the weight of the solid-color image is "−2", and the weight of the gradation image is "2". The heavier the processing load of image processing to be performed on an object becomes, the heavier the weight is set. Thus, it may be said in the example of FIG. 5 that the processing load becomes lighter in the order of the image, the gradation image, and the solid-color image. Note that, in the case where the weight is a minus number for a certain object in the present exemplary embodiment, the processing load is lighter for the object in the case where the processing is performed by software processing than in the case where the processing is performed by the hardware accelerator 16. That is, this shows that the processing time period for the case where the processing is performed by software processing is shorter.

The area of the image is denoted by M1$x$, and the weight of the image is denoted by K1. The area of the solid-color image is denoted by M2$x$, and the weight of the solid-color image is denoted by K2. The area of the gradation image is denoted by M3$x$, and the weight of the gradation image is denoted by K3. A processing load Fx is calculated using the following expression.

$$Fx = M1x \times K1 + M2x \times K2 + M3x \times K3 \qquad (1)$$

Note that x is a sign representing a division region. In the example of FIG. 4, x is any of A, B, C, and D.

For example, in the case of the division region A, 10% of the division region A is the image 30A, 0% of the division region A is the solid-color image 30B, and 20% of the division region A is the gradation image 30C in area. Thus, a processing load FA is "90" in accordance with the above-described Expression (1). Likewise, a processing load FB of the division region B is "294", a processing load FC of the division region C is "32", and a processing load FD of the division region D is "−40".

In step S108, for image processing, priority ranks are set for the division regions A to D in accordance with the processing loads of the division regions A to D calculated in step S106. As illustrated in FIG. 5, since the processing load becomes lighter in the order of the division regions B, A, C, and D, the first to fourth ranks are set for the respective division regions B, A, C, and D in accordance with this order. That is, the priority ranks here are ranks determined in accordance with the processing loads and indicating that the higher the rank, the better the processing is performed by hardware. Note that since the processing load of the division region D is a minus number, the processing load becomes lighter for the division region D when the processing is performed by software processing than when the processing is performed by the hardware accelerator 16.

In step S110, it is determined whether the hardware accelerator 16 is not being used in the print process. In the case of no in step S110, that is, in the case where the hardware accelerator 16 is not used, the process proceeds to step S112. In the case of yes in step S110, that is, in the case where the hardware accelerator 16 is being used, the process proceeds to step S122.

Here, the print process is a process in which raster data for printing is generated by performing the above-described various types of image processing on the intermediate data generated in step S102, and the generated raster data is output to the image forming unit 12 and then printed.

In step S112, a division region for which processing is to be performed by the hardware accelerator 16 is selected in descending order of the priority ranks set in step S108. That is, the division region having the highest priority rank is selected from among the division regions for which image processing has not yet been performed. Then, the division-region data of the selected division region is output to the hardware accelerator 16, and a preview-image-data generation process is executed.

Here, the preview-image-data generation process is a process in which raster data for display is generated by performing the above-described various types of image processing on the intermediate data generated in step S102. Raster data for display is data representing an image that has substantially the same image quality as an image to be printed but whose image size is smaller than that of the image to be printed.

In step S114, it is determined whether or not the preview-image-data generation process performed by the hardware accelerator 16 is completed. In the case of yes in step S114, the process proceeds to step S116. In the case of no in step S114, the process is delayed until the preview-image-data generation process performed by the hardware accelerator 16 is completed.

In step S116, it is determined whether or not the preview-image-data generation process has been completed for all the division regions. In the case of yes in step S116, the process proceeds to step S128. In the case of no in step S116, the process proceeds to step S118.

In step S118, it is determined whether or not, for example, a command to perform a print process is received from a user. In the case of yes in step S118, the process proceeds to step S120. In the case of no in step S118, the process returns to step S110.

In step S120, the print data for the received print process is output to the hardware accelerator 16. As a result, the print process is executed by the hardware accelerator 16, and raster data for printing is generated. The generated raster data for printing is then output to the image forming unit 12, and the image based on the generated raster data is printed on a recording medium such as a paper sheet.

As described above, it is determined in step S110 whether the hardware accelerator 16 is not being used in the print process. Immediately after the print data is output to the hardware accelerator 16 in step S120, the hardware accelerator 16 is being used. Thus, the determination made in step S110 is no, and the process proceeds to step S122.

In step S122, a division region for which preview-image data is to be generated by software processing is selected in ascending order of the priority ranks set in step S108. That is, the division region having the lowest priority rank is selected from among the division regions for which the preview-image-data generation process has not yet been performed. The preview-image generation program 24B is read out from the memory 24, and the preview-image-data generation process is executed on division-region data of the selected division region. As a result, preview-image data of the selected division region is generated.

In step S124, it is determined whether or not the preview-image-data generation process performed by software processing is completed. In the case of yes in step S124, the process proceeds to step S126. In the case of no in step S124, the process is delayed until the preview-image-data generation process performed by the software processing is completed.

In step S126, it is determined whether or not the preview-image-data generation process has been completed for all the division regions. In the case of yes in step S126, the process proceeds to step S128. In the case of no in step S126, the process returns to step S110.

In step S128, the pieces of preview-image data of the respective division regions generated by the hardware accelerator 16 or by performing the software processing are combined.

In step S130, a preview image is output to the display 18 in accordance with the image data obtained by performing combination in step S128, the image data being data for the preview image. As a result, the preview image is displayed on the display 18.

In this manner, in the present exemplary embodiment, in the case where the hardware accelerator 16 is not used, the hardware accelerator 16 is caused to process pieces of division-region data in descending order of the processing loads, and simultaneously software processing is caused to be performed on pieces of division-region data in ascending order of the processing loads.

Note that the case where when the hardware accelerator 16 is not used, a piece of division-region data is selected in descending order of the priority ranks, and is output to the hardware accelerator 16, and preview-image data is generated in step S112 is described in the present exemplary embodiment. However, in the case where a processing load is a minus number, a processing time period is shorter in the case where the processing is performed by software processing than in the case where the processing is performed by the hardware accelerator 16. Thus, for division regions having a processing load that is a minus number, even when the hardware accelerator 16 is not used, preview-image data may be generated by software processing.

In addition, the case where, in step S118, printing is executed immediately after a command to perform the print process is received is described in the present exemplary embodiment. However, there may be a case where a command is issued such that raster data for printing is tentatively generated but execution of printing is put on hold. In this case, print data is not output to the hardware accelerator 16 in step S120, and the print data may be output to the hardware accelerator 16 when a command to start printing is issued.

(Second Exemplary Embodiment)

Next, a second exemplary embodiment of the present invention will be described. Note that an image forming apparatus has substantially the same configuration as that of the first exemplary embodiment, and thus description thereof will be omitted.

Figure 6:
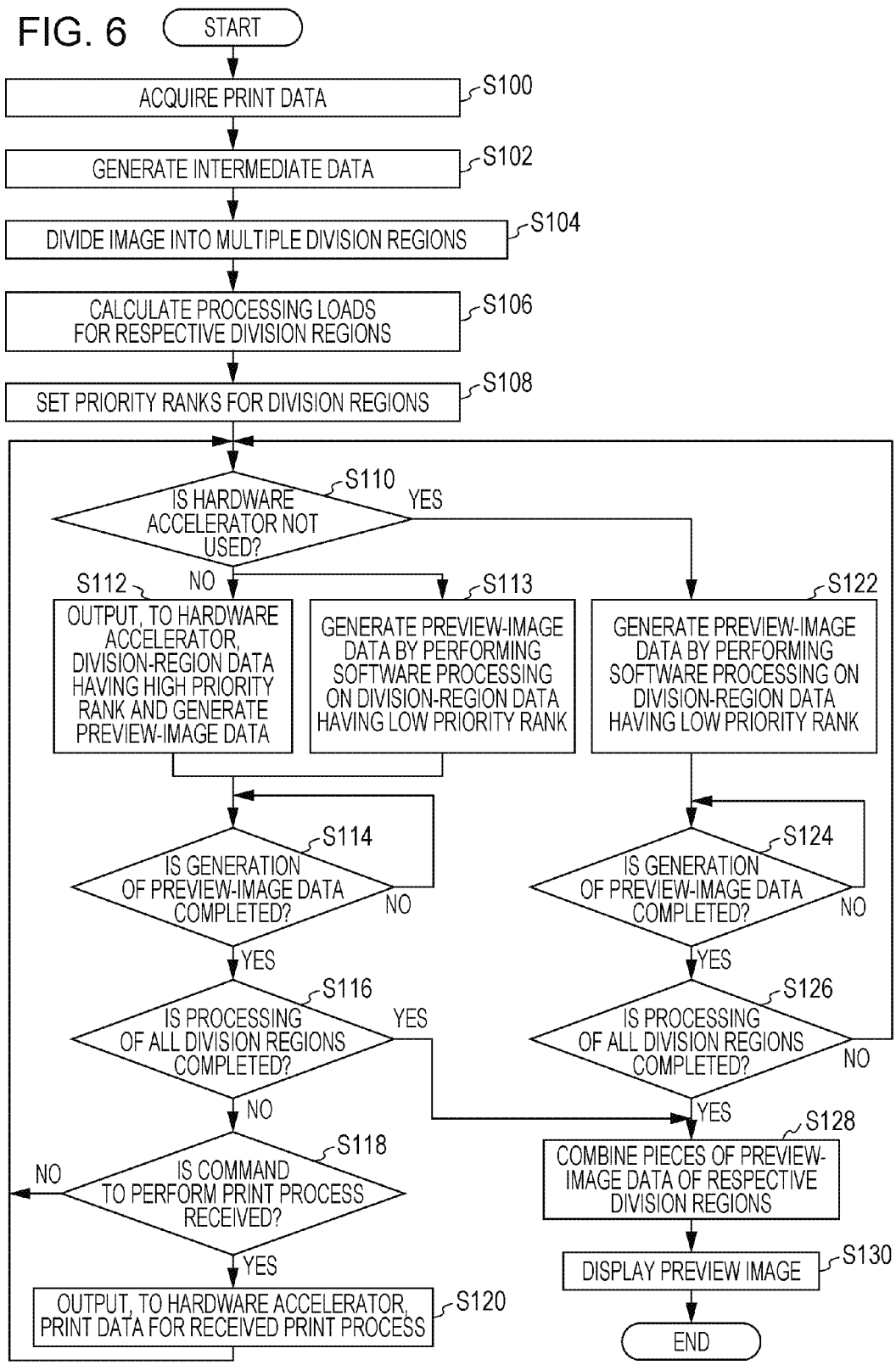
FIG. 6 is a flowchart illustrating an example of processing steps of an image processing program according to a second exemplary embodiment.

The process illustrated in FIG. 6 is a flowchart illustrating processing steps of the image processing program 24A executed by the CPU 14A according to the present exemplary embodiment.

The process illustrated in FIG. 6 differs from the process illustrated in FIG. 2 in that the processing in step S113 is executed in parallel with step S112. The other processing is substantially the same as that of FIG. 2, and thus description thereof will be omitted.

In step S113, processing substantially the same as that of step S122 is executed. That is, in step S112, a piece of division-region data is selected in descending order of the priority ranks, and preview-image data is generated by the hardware accelerator 16. In parallel with step S112, in step S113, a piece of division-region data is selected in ascending order of the priority ranks, and preview-image data is generated by software processing.

(Third Exemplary Embodiment)

Next, a third exemplary embodiment of the present invention will be described. Note that an image forming apparatus has the substantially the same configuration as that of the first exemplary embodiment, and thus description thereof will be omitted.

Figure 7:
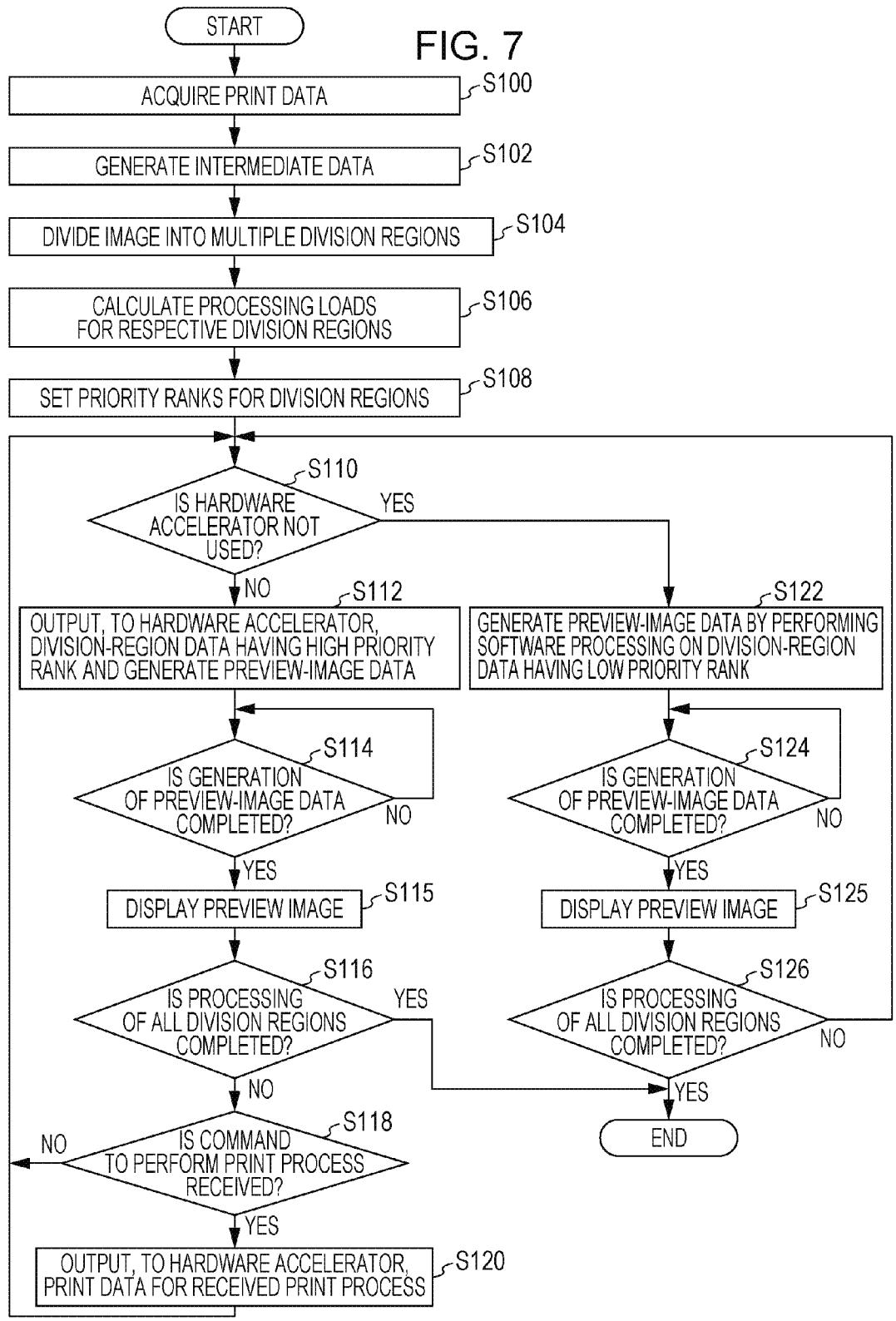
FIG. 7 is a flowchart illustrating an example of processing steps of an image processing program according to a third exemplary embodiment.

The process illustrated in FIG. 7 is a flowchart illustrating processing steps of the image processing program 24A executed by the CPU 14A according to the present exemplary embodiment.

The process illustrated in FIG. 7 differs from the process illustrated in FIG. 2 in that the processing in step S115 is added after step S114, the processing in step S125 is added after step S124, and the processing in steps S128 and S130 is omitted. The other processing is substantially the same as that of FIG. 2, and thus description thereof will be omitted.

The case where the entire preview image is displayed after the preview-image-data generation process is completed for all the division regions is described in the first and second exemplary embodiments. However, in the present exemplary embodiment, for each division region, every time the preview-image generation process is completed for the division region, the preview images of division regions for which the preview-image generation process is completed are displayed in steps S115 and S125.

The exemplary embodiments are described above. The technical scope of the present invention is not limited to the scope of the description of the above-described exemplary embodiments. Various changes or improvements may be added to the above-described exemplary embodiments without departing from the scope of the gist of the present invention. Embodiments to which such changes or improvements are added also fall within the technical scope of the present invention.

For example, the case where a processing load is calculated using the area of an object as a feature value of the object is described in the above-described exemplary embodiments. However, a feature value of the object is not limited to this. A processing load may be calculated using the amount of data of intermediate data of an object as a feature value of the object.

The case where an image is divided into multiple division regions in accordance with intermediate data is described in the above-described exemplary embodiments. However, an image may also be divided into multiple division regions in accordance with raster data.

The case where the image 30 illustrated in FIG. 3 is equally divided in the Y direction is described in the above-described exemplary embodiments. However, the image 30 may also be divided on an object-by-object basis. In this case, as illustrated in FIG. 3, the image 30 is divided into the image 30A, the solid-color image 30B, the gradation image 30C, and the other region. In the case where the image 30 is divided in accordance with intermediate data, the image 30 is divided using the type of object included in the intermediate data. In the case where the image 30 is divided in accordance with raster data, the image 30 is divided additionally using tag information in which the type of object is defined.

In addition, the case where a certain image processing program is preinstalled in the memory 24 is described in the above-described exemplary embodiments. However, the present invention is not limited to this. For example, the image processing program may be stored in a storage medium such as a compact-disk read-only memory (CD-ROM) and then provided, or may be provided via a network.

Furthermore, the configuration of the image forming apparatus 10 (see FIG. 1) described in the above-described exemplary embodiments is an example. It goes without saying that unnecessary portions may be removed and new portions may be added without departing from the scope of the gist of the present invention.

In addition, the processing steps of the image processing program (see FIGS. 2, 6, and 7) described in the above-described exemplary embodiments are also an example. It goes without saying that unnecessary steps may be removed, new steps may be added, and the order of steps may be changed without departing from the scope of the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a memory configured to store a program;
   a hardware accelerator; and
   a processor, which when instructed by the program, performs the functions of:
      a division unit that divides an image represented by image forming data into a plurality of division regions; and
      a generation unit that generates a piece of bitmap image data
         by causing the hardware accelerator to process a piece of division-region data selected from among pieces of division-region data of the plurality of division regions in descending order of processing loads of image processing performed when pieces of bitmap image data are generated from the respective pieces of division-region data, the processing loads being obtained for the plurality of respective division regions, and by causing a CPU to perform software processing on a piece of division-region data selected from among the pieces of division-region data in ascending order of the processing loads, wherein the processing by the hardware accelerator in descending order of processing loads and the processing by software processing in ascending order of processing loads are performed simultaneously in parallel.

2. The image processing apparatus according to claim 1, wherein the processor performs the additional function of a calculation unit that calculates, for each of the plurality of division regions, a processing load of the division region from a feature value representing characteristics of an image element included in the division region.

3. The image processing apparatus according to claim 2, wherein the feature value is the area of a region where the image element is drawn inside the division region or the amount of data of the image element.

4. The image processing apparatus according to claim 3, wherein the calculation unit calculates, for each of the plurality of division regions, the processing load of the division region from the feature value and a weight predetermined for the type of the image element among weights predetermined for respective types of image element.

5. The image processing apparatus according to claim 4, wherein the plurality of division regions are regions obtained by dividing, on an image-element-by-image-element basis, the image represented by the image forming data.

6. The image processing apparatus according to claim 3, wherein the plurality of division regions are regions obtained by dividing, on an image-element-by-image-element basis, the image represented by the image forming data.

7. The image processing apparatus according to claim 3, wherein the generation unit generates a piece of bitmap image data by causing the hardware accelerator to process a piece of division-region data selected from among the pieces of division-region data in descending order of the processing loads, and in parallel by causing the software processing to be performed on a piece of division-region data selected from among the pieces of division-region data in ascending order of the processing loads.

8. The image processing apparatus according to claim 3, wherein the image processing is processing for generating a piece of bitmap image data for preview display, and every time a piece of bitmap image data for preview display is generated from a piece of division-region data among the pieces of division-region data, the generation unit outputs the piece of bitmap image data so that a display is caused to display a preview image represented by the piece of bitmap image data.

9. The image processing apparatus according to claim 2, wherein the calculation unit calculates, for each of the plurality of division regions, the processing load of the division region from the feature value and a weight predetermined for the type of the image element among weights predetermined for respective types of image element.

10. The image processing apparatus according to claim 9, wherein the plurality of division regions are regions obtained by dividing, on an image-element-by-image-element basis, the image represented by the image forming data.

11. The image processing apparatus according to claim 9, wherein the generation unit generates a piece of bitmap image data by causing the hardware accelerator to process a piece of division-region data selected from among the pieces of division-region data in descending order of the processing loads, and in parallel by causing the software processing to be performed on a piece of division-region data selected from among the pieces of division-region data in ascending order of the processing loads.

12. The image processing apparatus according to claim 2, wherein the plurality of division regions are regions obtained by dividing, on an image-element-by-image-element basis, the image represented by the image forming data.

13. The image processing apparatus according to claim 2, wherein the generation unit generates a piece of bitmap image data by causing the hardware accelerator to process a piece of division-region data selected from among the pieces of division-region data in descending order of the processing loads, and in parallel by causing the software processing to be performed on a piece of division-region data selected from among the pieces of division-region data in ascending order of the processing loads.

14. The image processing apparatus according to claim 2, wherein the image processing is processing for generating a piece of bitmap image data for preview display, and every time a piece of bitmap image data for preview display is generated from a piece of division-region data among the pieces of division-region data, the generation unit outputs the piece of bitmap image data so that a display is caused to display a preview image represented by the piece of bitmap image data.

15. The image processing apparatus according to claim 1, wherein the plurality of division regions are regions obtained by dividing, on an image-element-by-image-element basis, the image represented by the image forming data.

16. The image processing apparatus according to claim 1, wherein the generation unit generates a piece of bitmap image data by causing the hardware accelerator to process a piece of division-region data selected from among the pieces of division-region data in descending order of the processing loads, and in parallel by causing the software processing to be performed on a piece of division-region data selected from among the pieces of division-region data in ascending order of the processing loads.

17. The image processing apparatus according to claim 16, wherein the image processing is processing for generating a piece of bitmap image data for preview display, and every time a piece of bitmap image data for preview display is generated from a piece of division-region data among the pieces of division-region data, the generation unit outputs the piece of bitmap image data so that a display is caused to display a preview image represented by the piece of bitmap image data.

18. The image processing apparatus according to claim 1, wherein the image processing is processing for generating a piece of bitmap image data for preview display, and every time a piece of bitmap image data for preview display is generated from a piece of division-region data among the pieces of division-region data, the generation unit outputs the piece of bitmap image data so that a display is caused to display a preview image represented by the piece of bitmap image data.

19. The image processing apparatus according to claim 1, wherein the processor, when instructed by the program, performs the steps of i) processing of the division-region data by the hardware accelerator and by the software processing, ii) combining the processed pieces of division-region data to create a preview display image, and iii) displaying the preview image.

20. An image processing method comprising:
dividing an image represented by image forming data into a plurality of division regions; and
generating a piece of bitmap image data by processing with a hardware accelerator a piece of division-region data selected from among pieces of division-region data of the plurality of division regions in descending order of processing loads of image processing performed when pieces of bitmap image data are generated from the respective pieces of division-region data, the processing loads being obtained for the plurality of respective division regions, and by performing software processing on a piece of division-region data selected from among the pieces of division-region data in ascending order of the processing loads, wherein the processing by the hardware accelerator in descending order of processing loads and the processing by software processing in ascending order of processing loads are performed simultaneously in parallel.

21. The image processing method according to claim 20, further comprising the steps of:

processing of the division-region data by the hardware accelerator and by the software processing;
combining the processed pieces of division-region data to create a preview display image; and
displaying the preview image.

22. A non-transitory computer readable medium storing a program causing a computer to execute a process, the process comprising:
dividing an image represented by image forming data into a plurality of division regions; and
generating a piece of bitmap image data by processing with a hardware accelerator a piece of division-region data selected from among pieces of division-region data of the plurality of division regions in descending order of processing loads of image processing performed when pieces of bitmap image data are generated from the respective pieces of division-region data, the processing loads being obtained for the plurality of respective division regions, and by performing software processing on a piece of division-region data selected from among the pieces of division-region data in ascending order of the processing loads, wherein the processing by the hardware accelerator in descending order of processing loads and the processing by software processing in ascending order of processing loads are performed simultaneously in parallel.

23. The non-transitory computer readable medium according to claim 22, wherein the program causes the computer to execute the further steps of:
processing of the division-region data by the hardware accelerator and by the software processing;
combining the processed pieces of division-region data to create a preview display image; and
displaying the preview image.

* * * * *